Dec. 31, 1929.   J. A. WRIGHT   1,741,550
REAR AXLE ASSEMBLY
Filed Jan. 8, 1927
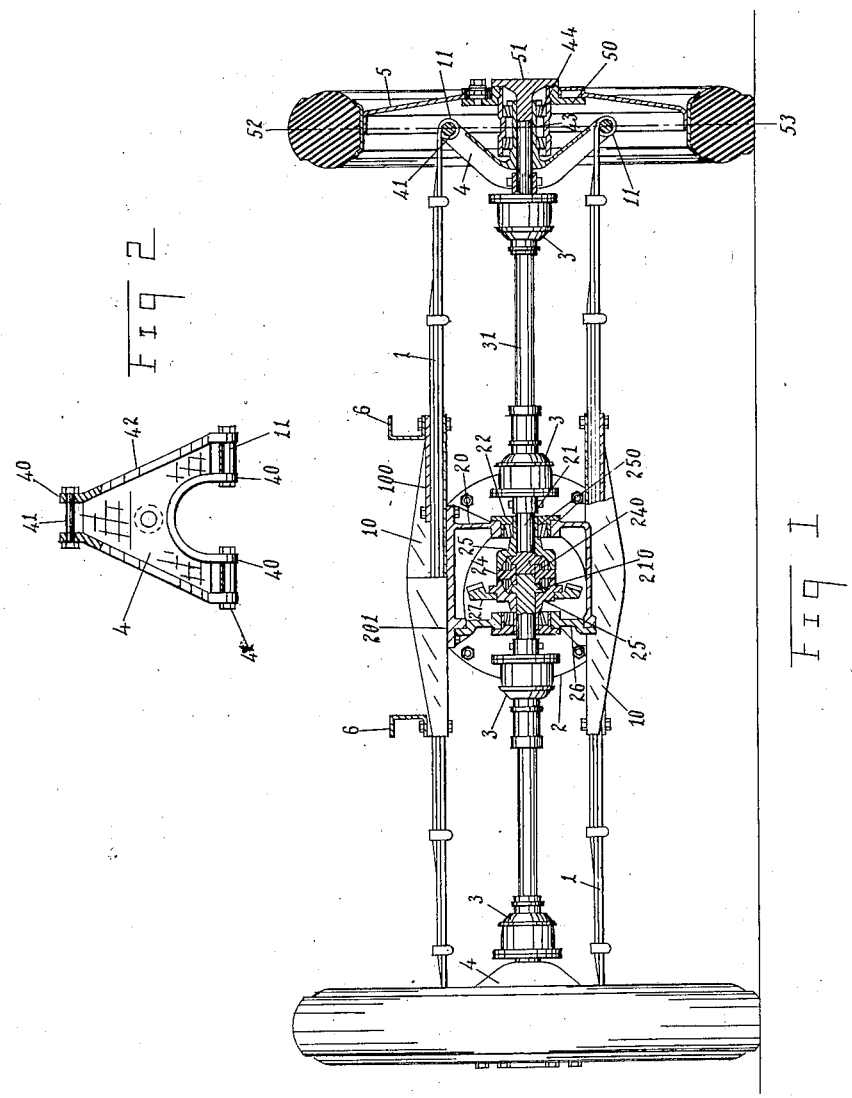
INVENTOR
JAMES A. WRIGHT
BY
ATTORNEY Patented Dec. 31, 1929

1,741,550

UNITED STATES PATENT OFFICE

JAMES A. WRIGHT, OF MONTREAL, QUEBEC, CANADA

REAR-AXLE ASSEMBLY

Application filed January 8, 1927. Serial No. 159,908.

This invention relates to the rear axle assembly of motor vehicles and particularly to those having transverse spring suspension.

It has for its object to provide an improved spring suspension for the rear wheels of motor vehicles having flexible axles.

A further object is to provide a spring suspension without radius rods or shackle links, having wheel bearings balanced on the load plane of the wheel, on a wheel carrier which is coupled on the said plane to the spring mounting.

A further object is to provide an improved differential, differential casing and spring mounting.

Further objects will be set forth in the specification hereinafter.

Reference is made to the accompanying drawings in which:

Figure 1 is an end view of the rear wheel assembly partly in section.

Figure 2 is an end view of the wheel carrier from the inside.

The differential casing 20 secured to the chassis frame 2 has seats 201 above and below to which the transverse springs 1—1 are held by the housings 10 which extend beyond the sides of the casing 20 and are thereby maintained parallel to each other. The springs terminate in looped ends 11.

The springs 1—1 are secured in the housings 10 by anchor plates 100 and the chassis brackets 6 rest on the outer ends of the top anchor plates 100 and are secured to both anchor plate 100 and housing 10.

The differential comprises the usual cupped parts 25 which have sleeves 250 extending outwardly.

The spider 24 which is bored to receive the ends of the stub shafts 21, is held between the cups 25 and carries the bevel gear 240 which meshes with the bevel gears 210 integral with the stub shafts 21.

The sleeves 250 extend into the roller bearings 22, which are mounted in the sides of the casing 20. One of the plates 26 is removable to permit of the assembly and of ready access to the differential.

The ring gear 27 secured to one of the cups 25 operates the differential. The stub shafts 21 with their integral bevel gear 210 have their adjacent ends journalled in the spider 24 and the sleeves 250 extend through the bearings 22 to the universal joints 3 which connect the stub shafts 21 to the Cardan shafts 31 and through the outer universal joints 3 to the stub axles 51.

The disc wheels 5 have hubs 50 secured to the flanged ends of the stub axles 51, and to roller bearings 44 mounted on the sleeve 43 of the wheel carrier 4, in balanced position on the load plane of the wheel.

The wheel carriers 4 as shown in Figure 2 comprise a Y-shaped member, having a sleeve 43 extending from its center bore, and having its extremities inclined over the sleeve 43 provided with forked bearings 40 for bolts 41 on which the loops 11 of the springs 1 are mounted.

The bolts 41 are journalled in the load plane of the wheels 5. The wheel carrier 4 is strengthened by marginal ribs 42. Other forms of wheel carriers may be adopted, such as an H-shaped member for four springs, or a simple arch for two springs.

With a construction such as above set forth, the weight of the vehicle will be transmitted to the wheels through the springs in the load plane of the wheels, and these wheels run on bearings balanced on this plane, providing the widest form of spring suspension. Road stresses are therefore transmitted to the ends of the springs directly over the center of road contact of the tire. All twisting stresses are thereby avoided. The springs being of the maximum length provide the greatest amount of resiliency and thereby give very smooth running.

The wheels are maintained vertical to the roadway and parallel to the center line of the chassis under all conditions and side sway of the chassis is thereby prevented.

The safe running of the vehicle will be increased to a marked degree, particularly when running over large obstructions or on roadways inclined sideways.

The driving power of the differential ring gear will be transmitted through the bevel gear on the spider to the stub shafts and thence through the universal joints and the Cardan shafts to the stub axles and the hub of the wheel.

By making the bevel gears integral with the stub shafts in the differential, greater rigidity and durability will be obtained and a larger stub shaft can be employed.

By providing for the removal of the side plate of the differential casing, the assembly and repair of the parts will be readily carried out.

The application of the invention to other forms of construction may be carried out without alteration of its particular features or mode of operation.

What I claim is:—

In a device of the class specified, a disc wheel having an inwardly projecting hub comprising a sleeve and a central stub axle, combined with a wheel carrier having an outwardly projecting sleeve mounted on the stub axle on which roller bearings are mounted between the sleeves, and spring bearing supports extending over the hub and providing bearings for the ends of the transverse springs in the load plane of the wheel.

JAMES A. WRIGHT.